United States Patent
Taracko et al.

(10) Patent No.: US 9,365,241 B1
(45) Date of Patent: Jun. 14, 2016

(54) VEHICLE CRASH MANAGEMENT APPARATUS AND METHODS OF USE AND MANUFACTURE THEREOF

(71) Applicant: Honda Motor Co., Ltd., Tokyo (JP)

(72) Inventors: Matthew Lee Taracko, Marysville, OH (US); Adam Joseph Upah, Cable, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/639,042

(22) Filed: Mar. 4, 2015

(51) Int. Cl.
| | |
|---|---|
| *B60J 7/00* | (2006.01) |
| *B62D 21/15* | (2006.01) |
| *B62D 21/11* | (2006.01) |
| *B62D 21/02* | (2006.01) |
| *B60R 19/34* | (2006.01) |
| *B62D 65/02* | (2006.01) |
| *B60R 19/24* | (2006.01) |

(52) U.S. Cl.
CPC .............. *B62D 21/155* (2013.01); *B60R 19/34* (2013.01); *B62D 21/02* (2013.01); *B62D 21/11* (2013.01); *B62D 65/02* (2013.01); *B60R 2019/242* (2013.01)

(58) Field of Classification Search
CPC .................. H01L 2924/00; H01L 2924/00014; H01L 2224/48465; H01L 2224/48091; H01L 2224/48247; B60R 21/0132; B60R 2021/26094; B60R 21/0134; B60R 21/013; B60N 2/002; B62D 21/155; B62D 21/15
USPC .................. 296/187.09, 193.09, 205, 203.02; 180/271, 274, 282; 293/133
See application file for complete search history.

(56) References Cited

U.S. PATENT DOCUMENTS

| | | | | |
|---|---|---|---|---|
| 3,831,997 A * | 8/1974 | Myers ..................... | F16F 7/123 |
| | | | | 188/377 |
| 4,148,505 A | 4/1979 | Jensen et al. | | |
| 4,781,398 A * | 11/1988 | Uebelstadt ............. | B62D 21/15 |
| | | | | 280/784 |
| 5,201,566 A * | 4/1993 | Mori ....................... | B62D 21/11 |
| | | | | 296/192 |
| 5,327,989 A * | 7/1994 | Furuhashi ................ | B60G 3/20 |
| | | | | 180/248 |
| 5,579,699 A | 12/1996 | Dannawi et al. | | |
| 6,053,564 A * | 4/2000 | Kamata ................ | B62D 21/152 |
| | | | | 296/187.09 |
| 6,102,605 A * | 8/2000 | Emmons ................ | B62D 21/09 |
| | | | | 296/209 |
| 6,109,654 A * | 8/2000 | Yamamoto ............. | B62D 21/11 |
| | | | | 180/299 |
| 6,170,906 B1 * | 1/2001 | Kasuga ................. | B62D 29/008 |
| | | | | 296/203.02 |
| 6,250,710 B1 * | 6/2001 | Matsuzaki ........... | B62D 25/081 |
| | | | | 296/187.09 |
| 6,296,300 B1 | 10/2001 | Sato | | |
| 6,312,038 B1 * | 11/2001 | Kawamura ........... | B60N 2/4221 |
| | | | | 296/187.09 |
| 6,409,255 B2 * | 6/2002 | Tilsner ..................... | 296/187.09 |
| 6,416,119 B1 * | 7/2002 | Gericke ................ | B62D 21/12 |
| | | | | 29/897.2 |

(Continued)

*Primary Examiner* — Kiran B Patel
(74) *Attorney, Agent, or Firm* — Kenealy Vaidya LLP

(57) ABSTRACT

A crash management system includes a main frame that is configured to define a vehicular passenger compartment and that includes a lower cross member generally extending along a transverse direction of the vehicle. A front sub-frame includes a pair of bent members. Each of the bent members includes a longitudinal portion that extends along a longitudinal direction of the vehicle and that is configured to support the suspension components. Each of the bent members also includes a bend portion that extends from the respective longitudinal portion at an angle and that is disposed between the respective longitudinal portion and the lower cross member of the main frame. The longitudinal and bend portions are configured such that each of the bend portions deform, and each of the longitudinal portions continue to extend substantially longitudinally, if the impact energy applied to the vehicle exceeds a first threshold.

20 Claims, 10 Drawing Sheets

(56) References Cited

U.S. PATENT DOCUMENTS

| | | | | |
|---|---|---|---|---|
| 6,533,348 | B1 * | 3/2003 | Jaekel | B62D 29/00 296/203.04 |
| 6,540,284 | B2 * | 4/2003 | Miyata | B62D 25/088 180/68.4 |
| 6,921,126 | B2 * | 7/2005 | Suh | B62D 25/088 296/187.09 |
| 7,066,533 | B2 * | 6/2006 | Sohmshetty | B62D 25/082 296/187.09 |
| 7,219,954 | B2 * | 5/2007 | Gomi | B62D 25/082 296/187.09 |
| 7,243,986 | B2 * | 7/2007 | Dupuis | B62D 27/02 296/205 |
| 7,281,757 | B2 * | 10/2007 | Dupuis | B62D 27/02 296/205 |
| 7,341,299 | B1 * | 3/2008 | Baccouche | B62D 21/152 296/203.02 |
| 7,441,819 | B2 * | 10/2008 | Azzouz | B62D 21/08 296/203.02 |
| 7,637,562 | B2 * | 12/2009 | Andre | B60Q 1/0491 296/193.09 |
| 7,871,123 | B2 * | 1/2011 | Stojkovic | B62D 25/04 296/193.09 |
| 8,136,871 | B2 | 3/2012 | Yoshida et al. | |
| 8,152,215 | B1 * | 4/2012 | Tsumiyama | B60N 2/015 296/63 |
| 8,152,224 | B2 * | 4/2012 | Faruque | B62D 21/152 296/187.09 |
| 8,419,111 | B2 | 4/2013 | Uchida et al. | |
| 8,424,960 | B2 | 4/2013 | Rawlinson et al. | |
| 8,485,591 | B2 * | 7/2013 | Kihara | B62D 25/082 296/193.07 |
| 9,108,680 | B2 * | 8/2015 | Suzuki | B62D 25/082 |
| 2007/0252412 | A1 * | 11/2007 | Yatsuda | B62D 25/082 296/193.09 |
| 2008/0098701 | A1 * | 5/2008 | Takeshima | F02M 35/024 55/385.3 |
| 2008/0210483 | A1 * | 9/2008 | Takahashi | B60K 17/352 180/250 |
| 2008/0257632 | A1 * | 10/2008 | Takeshima | B62D 21/00 180/312 |
| 2009/0058146 | A1 * | 3/2009 | Kobayashi | B60N 2/22 296/204 |
| 2009/0072603 | A1 * | 3/2009 | Kobayashi | B60N 2/22 297/354.1 |
| 2010/0230981 | A1 * | 9/2010 | Hock | B60R 19/12 293/132 |
| 2012/0049571 | A1 * | 3/2012 | Katou | B62D 21/155 296/187.09 |
| 2012/0160586 | A1 * | 6/2012 | Tsumiyama | B60N 2/012 180/89.1 |
| 2012/0160589 | A1 * | 6/2012 | Tsumiyama | B60N 2/012 180/291 |
| 2012/0160592 | A1 * | 6/2012 | Tsumiyama | B62D 23/005 180/312 |
| 2012/0161427 | A1 * | 6/2012 | Tsumiyama | B60J 5/0487 280/781 |
| 2012/0161468 | A1 * | 6/2012 | Tsumiyama | B60J 5/0487 296/146.11 |
| 2012/0181803 | A1 | 7/2012 | Snell et al. | |
| 2013/0087397 | A1 * | 4/2013 | Yamamoto | B60G 3/20 180/68.4 |
| 2014/0015280 | A1 * | 1/2014 | Ohta | B62D 21/152 296/187.08 |
| 2014/0167399 | A1 * | 6/2014 | Koberstein | B62K 5/01 280/782 |
| 2015/0343900 | A1 * | 12/2015 | Schlangen | B60G 3/20 180/247 |

\* cited by examiner

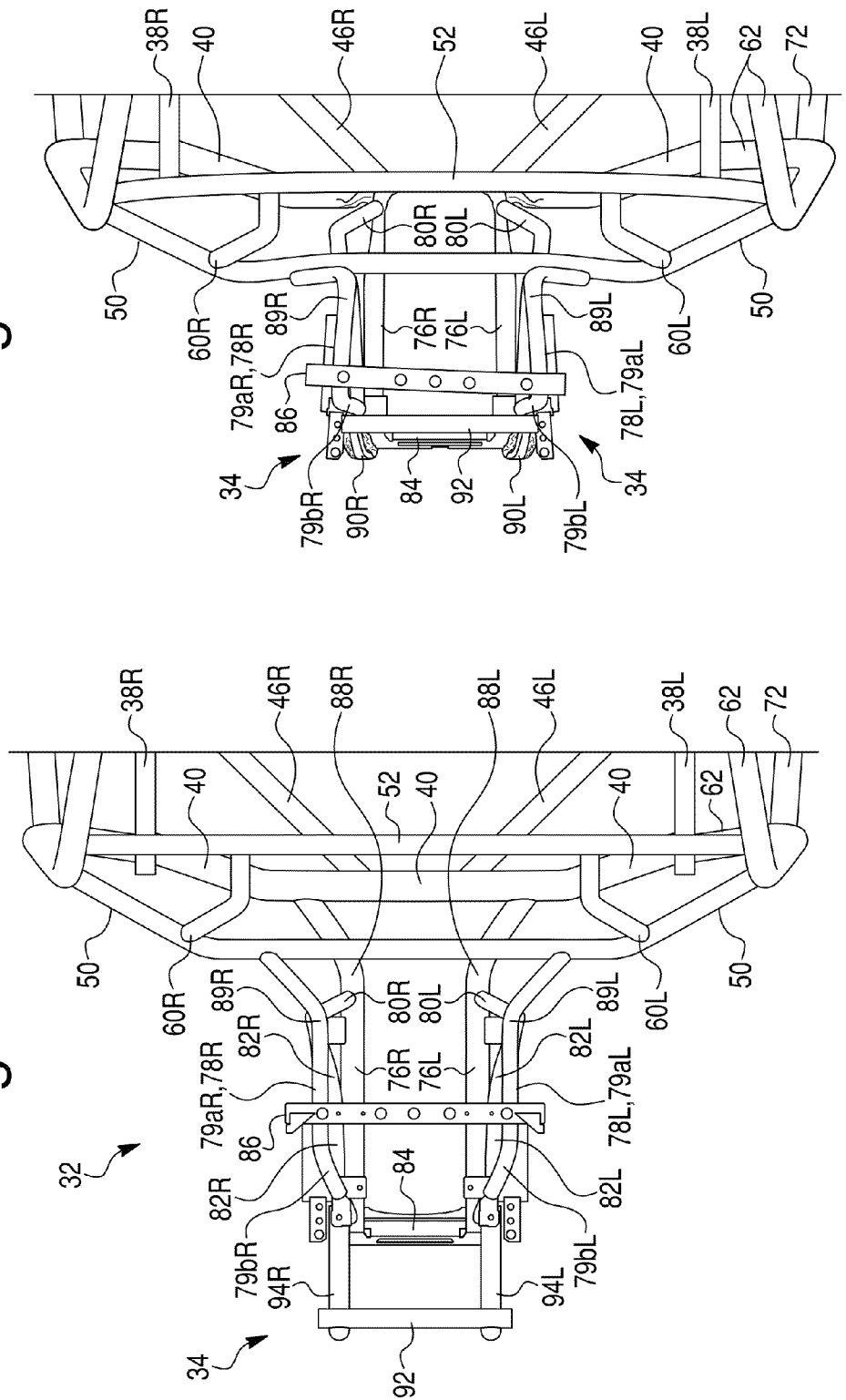

VEHICLE CRASH MANAGEMENT APPARATUS AND METHODS OF USE AND MANUFACTURE THEREOF

BACKGROUND

The disclosed subject matter relates to a vehicle crash management apparatus, and methods of use and manufacture thereof. More particularly, the disclosed subject matter relates to methods and apparatus that enhance vehicular energy management performance upon application of external stresses, such as may occur upon vehicular collisions or crash events.

Stresses, and in some cases extreme stresses, can be communicated to vehicles under certain circumstances, including vehicular collisions or crash events. These stresses can cause one or more portions of the vehicular frame to deform, including one or more portions of the vehicular frame proximate the passenger area. This deformation or movement can be influenced by a variety of factors, including the magnitude of the stress (such as resulting from crash speed), mass, stiffness, and geometric interaction of various vehicular components.

SUMMARY

However, various vehicular design factors may make it challenging to sufficiently impede or prevent deformation of the vehicular frame proximate the passenger area upon application of significant impact loads. For example, space constraints and off-road durability may make it beneficial to provide very stiff portions of the vehicular frame that are spaced from the passenger area, such as but not limited to frame structures around the front suspension components, rear suspension components and/or powertrain components. These relatively stiff portions of the vehicular frame can transmit most of or the entire impact energy to the portion of the vehicular frame defining the passenger area. These constraints and requirements may also limit the use of structures for managing the impact load. As a result, the portion of the vehicular frame defining the passenger area can be subject to deformation during an impact event.

It may therefore be beneficial to provide a vehicle crash management apparatus, and methods of use and manufacture thereof, that address at least one of the above and/or other challenges of related art vehicles. In particular, it may be beneficial to enhance vehicular energy management performance upon application of an external impact load, such as by controlling deformation of the vehicular frame and/or mitigating energy transmission to the passenger area caused by the external load. For example, portions of the vehicular frame assembly can be configured to absorb and transfer energy that originated from the external load.

In some of these and/or other embodiments, the vehicular frame can be configured to deform at portions spaced from the passenger area. In some of these and/or other embodiments, the frame can be configured with bends that can resist deformation during routine off-road usage of the vehicle, but that can deform in a predetermined controlled manner in response to an impact event. In some of these and/or other embodiments, the vehicular frame can be configured to deform in the vicinity of the passenger area in a predetermined controlled manner so that the dimensions of the passenger area after the impact event can be substantially the same as the dimensions of the passenger area prior to the impact event.

Some embodiments are therefore directed to a crash management system for dissipating at least a part of impact energy applied to a vehicle that includes suspension components and a passenger compartment. The crash management system can include a main frame that is configured to define the passenger compartment of the vehicle. The main frame can include a lower cross member that generally extends along a transverse direction of the vehicle. The crash management system can include a front sub-frame that includes a pair of bent members. Each of the bent members can include a longitudinal portion that extends along a longitudinal direction of the vehicle and that is configured to support the suspension components. Each of the bent members can also include a bend portion that extends from the respective longitudinal portion at an angle, and that is disposed between the respective longitudinal portion and the lower cross member of the main frame. The longitudinal and bend portions can be configured such that each of the bend portions deform, and each of the longitudinal portions continue to extend substantially longitudinally, if the impact energy applied to the vehicle exceeds a first threshold.

Some other embodiments are directed to a front sub-frame for dissipating at least a part of impact energy applied to a vehicle. The vehicle can include suspension components, a passenger compartment, and a main frame that is configured to define the passenger compartment. The main frame can include a lower cross member that generally extends along a transverse direction of the vehicle. The front sub-frame can include a pair of bent members. Each of the bent members can include a longitudinal portion that extends along a longitudinal direction of the vehicle and that is configured to support the suspension components. Each of the bent members can also include a bend portion that extends from the respective longitudinal portion at an angle and that is disposed between the respective longitudinal portion and the lower cross member of the main frame. The longitudinal and bend portions can be configured such that each of the bend portions deform, and each of the longitudinal portions continue to extend substantially longitudinally, if the impact energy applied to the vehicle exceeds a first threshold.

Still other embodiments are directed to a method of manufacturing a crash management system for dissipating at least a part of impact energy applied to a vehicle. The method can include: configuring a main frame to define a passenger compartment of the vehicle; extending a lower cross member of the main frame generally along a transverse direction of the vehicle; configuring a front sub-frame to include a pair of bent members; extending a longitudinal portion of each of the bent members along a longitudinal direction of the vehicle; supporting suspension components of the vehicle with the longitudinal portion of each of the bent members; extending a bend portion of each of the bent members from the respective longitudinal portion at an angle; disposing each of the bend portions between the respective longitudinal portion and the lower cross member of the main frame; and configuring the longitudinal and bend portions such that each of the bend portions deform, and each of the longitudinal portions continue to extend substantially longitudinally, if the impact energy applied to the vehicle exceeds a first threshold.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 8 is a top view of a front portion of the vehicle crash management apparatus of FIG. 2 prior to an impact event.

FIG. 9 is a top view of a front portion of the vehicle crash management apparatus of FIG. 2 subsequent to an impact event.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Overall Vehicle

Figure 1:
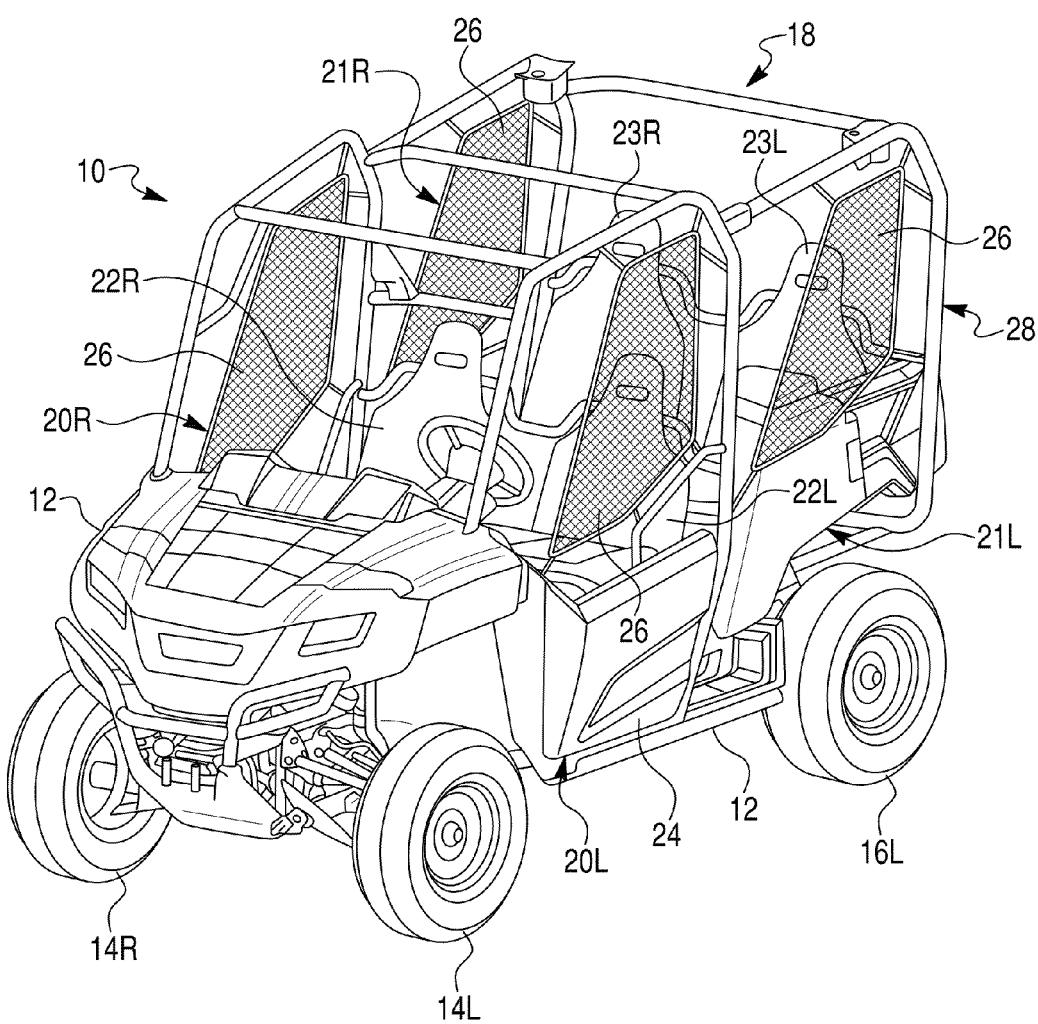
FIG. 1 is a perspective view of an exemplary vehicle including vehicle crash management apparatus in accordance with the disclosed subject matter.

FIG. 1 is a perspective view of an exemplary vehicle 10 including a vehicle crash management apparatus in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed vehicle crash management apparatus can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
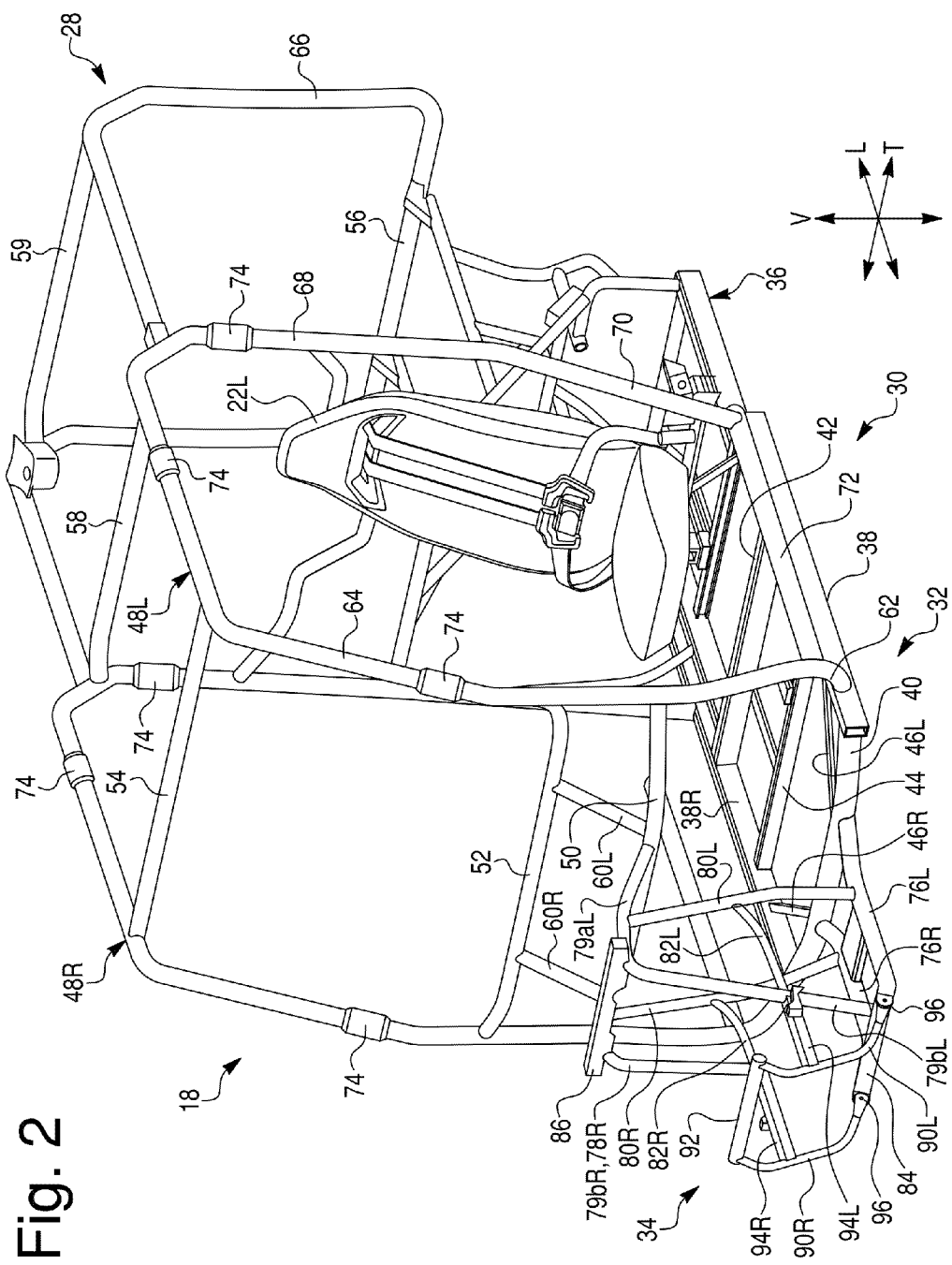
FIG. 2 is a perspective view of the vehicle crash management apparatus of the vehicle of FIG. 1.
Figure 3:
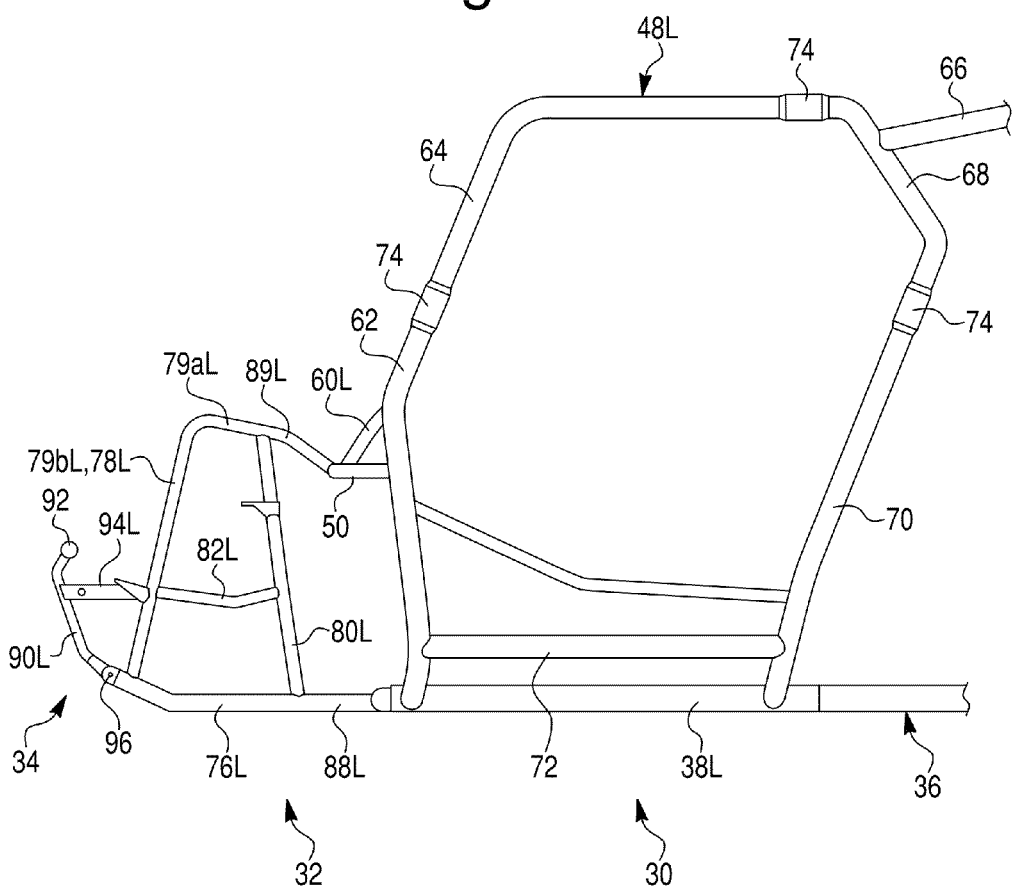
FIG. 3 is a partial side view of the vehicle crash management apparatus of FIG. 2.

The vehicle 10 can include a body 12, a pair of front wheels, 14L, 14R, a pair of rear wheels 16L, 16R (the right-side rear wheel 16R is obstructed from view), a frame assembly 18, a pair of front door assemblies 20L, 20R, a pair of rear door assemblies 21L, 21R, a frame assembly, and a powertrain. Portions of the frame assembly 18 are hidden from view in FIG. 1 by the body 12 (but are shown in FIG. 2), and the powertrain is omitted from FIG. 1 for simplicity and clarity of the drawing.

The vehicle 10 can include a pair of front seats 22L, 22R and a pair of rear seats 23L, 23R mounted in a passenger area of the vehicle 10. The frame assembly 18 can include a roll cage 28 configured to extend around and above the seats 22L, 22R, 23L, 23R and the passenger area. The roll cage 28 can cooperate with the body 12 and/or at least a portion of the frame assembly 18 to define a pair of door openings through which a passenger may pass in order to enter or exit the passenger area.

The door assemblies 20L, 20R, 21L, 21R, which occupy the door openings, each can include a door 24 and window panel assembly 26, and can be configured to selectively open and close access through the door openings by moving between a closed position and a fully opened position. (The doors 24 of the right-side door assemblies 20R, 21R is obscured from view in FIG. 1). In the closed position, the door assemblies 20L, 20R, 21L, 21R can span the respective door openings to obstruct access to the passenger area via the door openings. In the closed position, the front portion of each door assembly 20L, 20R, 21L, 21R can be latched to the roll cage 28. The fully opened position can be any position where the door assemblies 20L, 20R, 21L, 21R are pivoted away from the respective door openings to provide substantially unobstructed access to the passenger area via the door openings. FIG. 1 shows the door assemblies 20L, 20R, 21L, 21R in the closed position.

II. Frame Assembly

FIG. 2 is a perspective view of the frame assembly 18 and the left-side seat 22L. (The right-side front seat 22R and the rear seats 23L, 23R have been omitted for simplicity and clarity of the drawing.) The frame assembly 18 can be configured to support the body 12, door assemblies 20L, 20R, 21L, 21R, seats 22L, 22R, 23L, 23R, suspension components for the wheels 14L, 14R, 16L, 16R, powertrain, steering system, control pedal assemblies, passengers and cargo items. The frame assembly 18 can be configured to withstand operation on unimproved paths. As will be discussed in greater detail below, the frame assembly 18 can be configured to surround the passenger area to protect the passenger area during an impact event and/or during a roll-over event.

The frame assembly 18 can include a main frame assembly 30, a front sub-frame assembly 32, a front bumper assembly 34 and a rear sub-frame assembly 36. As will be discussed in greater detail below, the main frame assembly 30 can cooperate with the front sub-frame assembly 32 and the front bumper assembly 34 during an impact event to thereby manage the energy of an impact event so that deflection of the frame assembly 18 in the vicinity of the passenger area can be controlled in an advantageous predetermined manner.

The main frame assembly 30 can define the passenger area of the vehicle 10. The main frame assembly 30 can be configured to provide an overall bending stiffness and torsional stiffness of the vehicle 10 that can be advantageous for rugged terrain of an unimproved path.

The front sub-frame assembly 32 can be connected to the front end of the main frame assembly 30. The front sub-frame assembly 32 can be configured with mounting points for the front suspension components and any appropriate components/systems, such as but not limited to portions of the body 12, a front differential assembly, steering system components, etc.

The front bumper assembly 34 can be connected to the front end of the front sub-frame assembly 32, such that the front sub-frame assembly 32 can be located between the front bumper assembly 34 and the main frame assembly 30. The front bumper assembly 34 can extend beyond the exterior of the body 12, or alternatively the front bumper assembly 34 can be concealed by one or more portions of the body 12.

The main frame assembly 30, front sub-frame assembly 32, front bumper assembly 34 and rear sub-frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, fiber-reinforced plastic, carbon fiber, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Main Frame Assembly

The main frame assembly 30 can define the passenger area and can include the roll cage 28, a pair of longitudinal members 38L, 38R, a plurality of cross members 40, 42, 44 and a pair of diagonal members 46L, 46R. As will be discussed in further detail below, the roll cage 28 can be connected to the longitudinal members 38L, 38R.

The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The cross members 40, 42, 44 can extend in the transverse direction T of the vehicle 10, from the left longitudinal member 38L to the right longitudinal member 38R. The second and third cross members 42, 44 can be configured as a substantially straight, hollow beam having a substantially rectangular cross-sectional shape.

Figure 4:
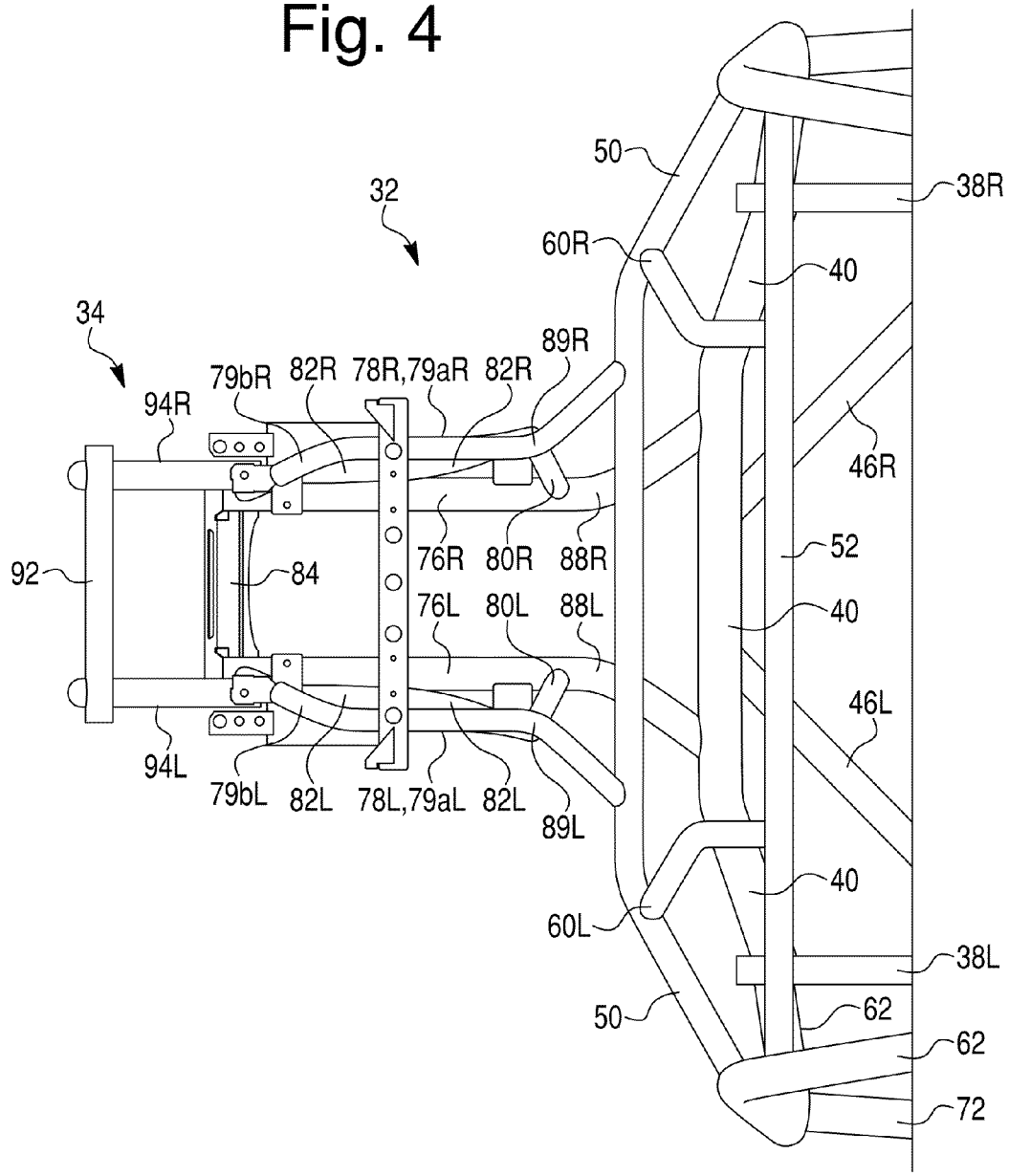
FIG. 4 is a top view of a front portion of the vehicle crash management apparatus of FIG. 2.
Figure 5:
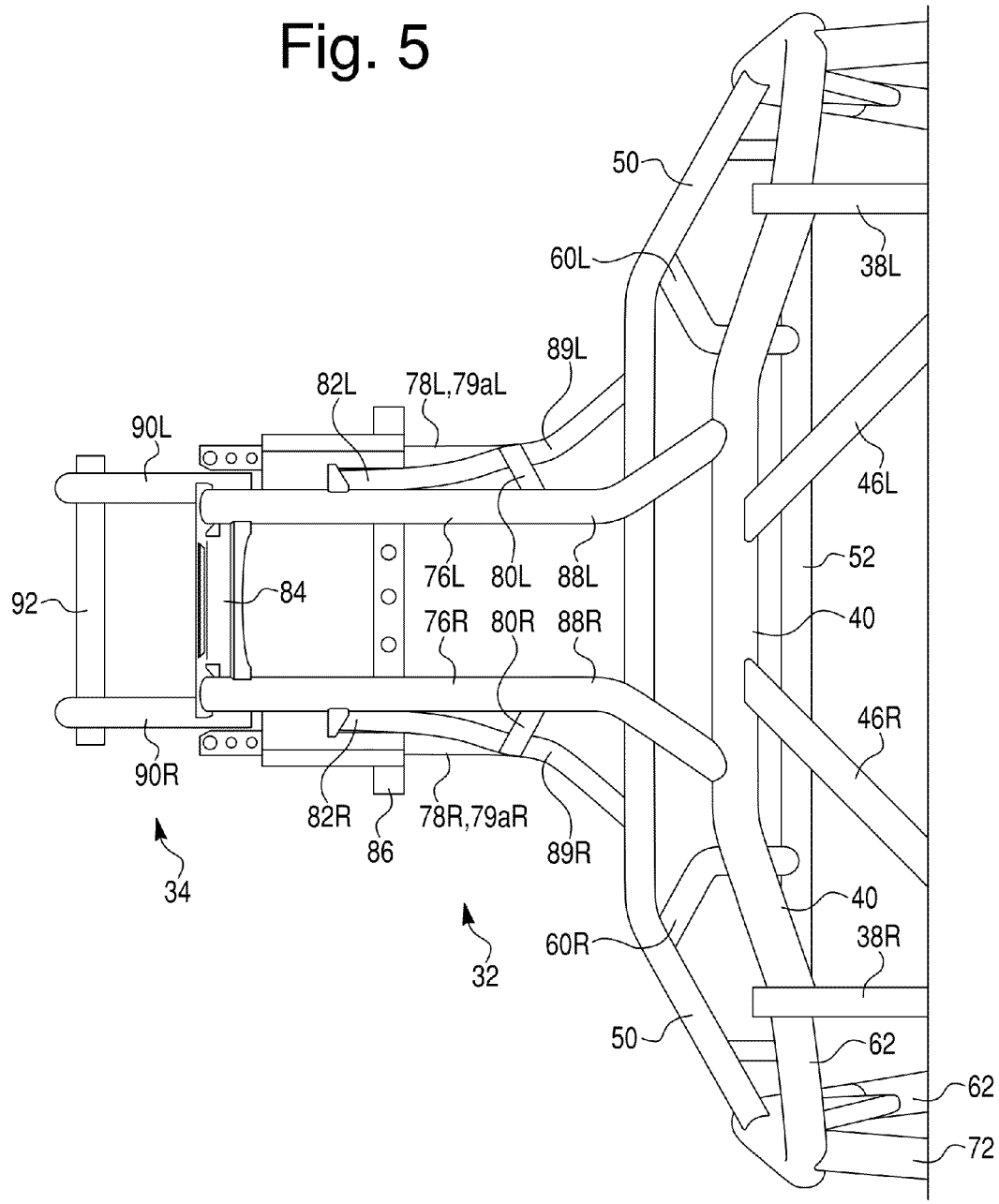
FIG. 5 is a bottom view of a front portion of the vehicle crash management apparatus of FIG. 2.
Figure 6:
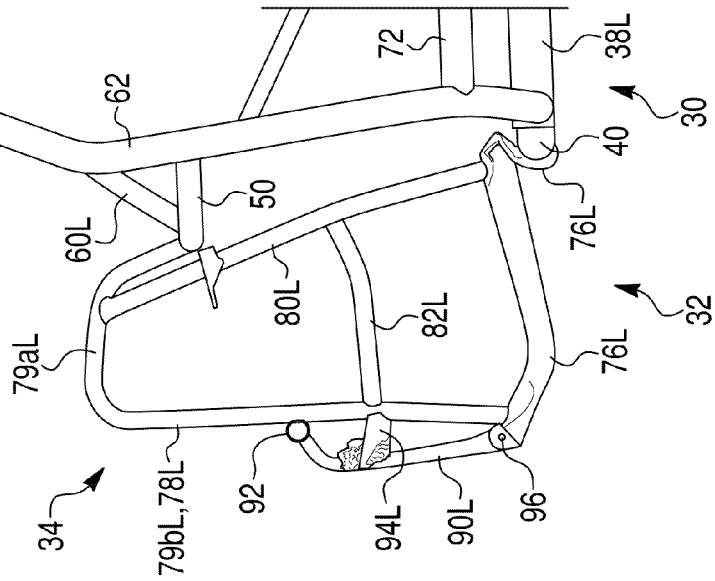
FIG. 6 is a partial side view of the vehicle crash management apparatus of FIG. 2 prior to an impact event.
Figure 7:
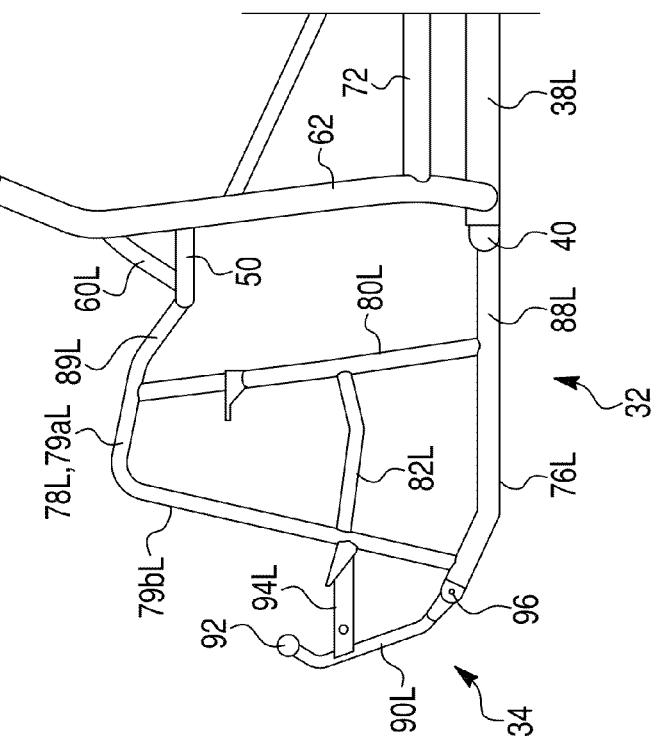
FIG. 7 is a partial side view of the vehicle crash management apparatus of FIG. 2 subsequent to an impact event.
Figure 10:
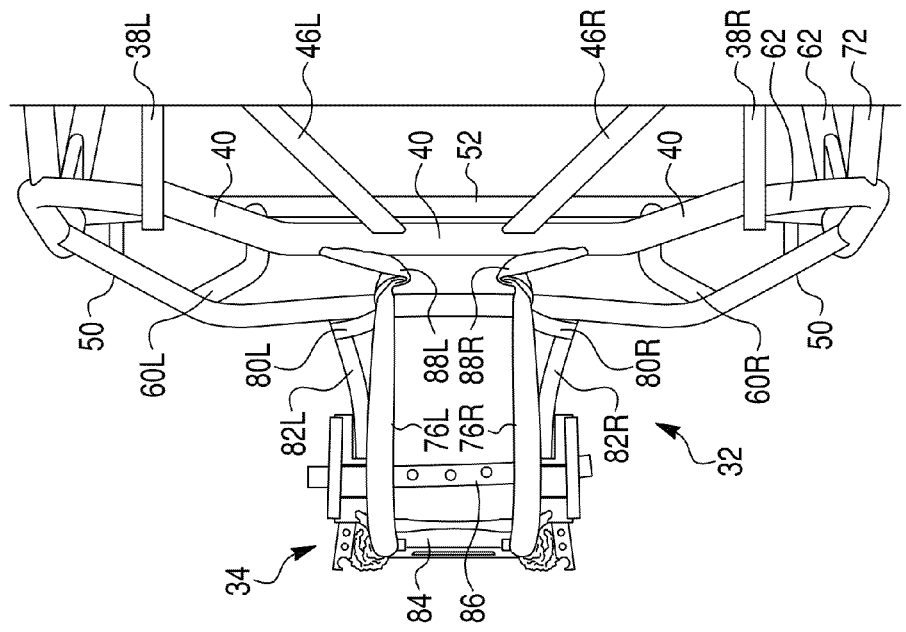
FIG. 10 is a bottom view of a front portion of the vehicle crash management apparatus of FIG. 2 prior to an impact event.
Figure 11:
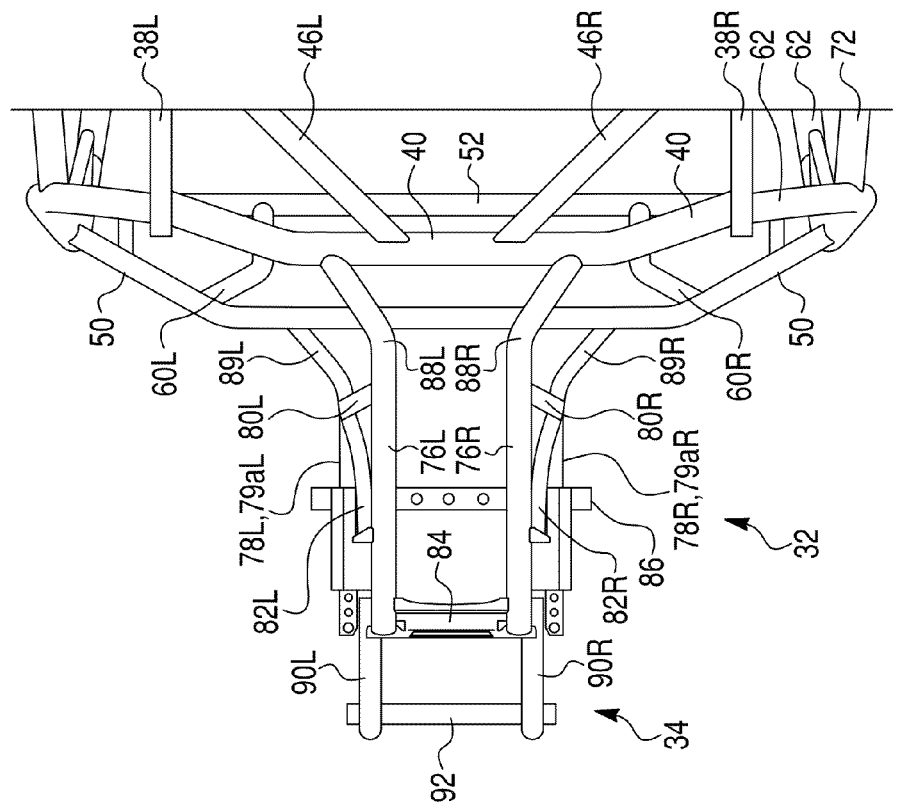
FIG. 11 is a bottom view of a front portion of the vehicle crash management apparatus of FIG. 2 subsequent to an impact event.

Referring to FIGS. 2, 4 and 5, the first cross member 40 can include a pair of substantially straight outer portions joined to a substantially straight central portion by two bend portions, such that the pair of outer portions can extend at an obtuse angle relative to the central portion. As a result, the first cross member 40 can extend in a generally arcuate shape from the left longitudinal member 38L to the right longitudinal member 38R, with the convex portion facing toward the front of the vehicle 10 and the concave portion facing toward the passenger area. The first cross member 40 can be configured as a hollow tube having a substantially circular cross-sectional shape. As will be discussed in detail below, the generally arcuate configuration of the first cross member 40 can be effective in managing the energy of an impact event so that deflection of the frame assembly 18 in the vicinity of the passenger area can be controlled in an advantageous predetermined manner.

The first cross member 40 can be connected to each of the longitudinal members 38L, 38R adjacent a respective front end of the longitudinal members 38L, 38R. The second cross member 42 can be connected to each of the longitudinal members 38L, 38R adjacent a respective rear end of the longitudinal members 38L, 38R. The third cross member 44 can be connected to each of the longitudinal members 38L, 38R at a portion of the longitudinal members 38L, 38R intermediate the front and rear ends of the respective longitudinal members 38L, 38R. In the exemplary embodiments of FIGS. 1-16, the first, second and third cross members 40, 42, 44 can be connected to the longitudinal members 38L, 38R by welding.

The diagonal members 46L, 46R can extend at an acute angle relative to the central portion of the first cross member 40. The diagonal members 46L, 46R can extend at an acute angle relative to the longitudinal members 38L, 38R. Each of the diagonal members 46L, 46R can be configured as a substantially straight, hollow beam having a substantially rectangular cross-sectional shape.

The left diagonal member 46L can be connected to the central portion of the first cross member 40 and to a portion of the left longitudinal member 38L intermediate the first cross member 40 and the third cross member 44. The right diagonal member 46R can be connected to an intermediate portion of the first cross member 40 and to a portion of the right longitudinal member 38R intermediate the first cross member 40 and the third cross member 44. The diagonal members 46L, 46R can be connected to the longitudinal members 38L, 38R by welding. As will be described in detail below, the diagonal members 46L, 46R can cooperate with the first cross member 40 and the respective one of the longitudinal members 38L, 38R to manage the energy of an impact event so that deflection of the frame assembly 18 in the vicinity of the passenger area can be impeded, reduced, or even minimized.

Returning to FIG. 2, the roll cage 28 can include a pair of side assemblies 48L, 48R, a plurality of cross members 50, 52, 54, 56, 58, 59 and a pair of support members 60L, 60R. The roll cage 28 generally defines the passenger compartment.

The side assemblies 48L, 48R can extend in the longitudinal direction L of the vehicle 10, from the front end of the passenger area to the rear end of the passenger area. The side assemblies 48L, 48R can define the limits of the passenger area in the transverse direction T of the vehicle 10, the longitudinal direction L of the vehicle 10 and in the vertical direction V of the vehicle 10. The side assemblies 48L, 48R can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The side assemblies 48L, 48 can be configured to resist, impede, or minimize deformation during a roll-over event and/or during a side impact event.

Each of the side assemblies 48L, 48R can be formed from any appropriate number of structural elements, from one to any number greater than one. The side assemblies 48L, 48R can be configured with any shape and contour that can be advantageous to meet the structural performance and aesthetic appeal desired for the vehicle 10. The following description will be directed toward the left side assembly 48L with the understanding that the right side assembly 48R can be a mirror image of the left side assembly 48L.

The left side assembly 48L can include a plurality of cage members 62, 64, 66, 68, 70, 72. The cage members 62, 64, 66, 68, 70, 72 can each be configured as a hollow tube having a substantially circular cross-section shape. The cage members 62, 64, 66, 68, 70, 72 can be configured with any appropriate elongated shape that can provide the desired dimensionality of the passenger area and advantageously conform to the aesthetic appearance desired for the vehicle 10.

The first cage member 62 can be connected at one end to the left longitudinal member 38L adjacent the front end of the left longitudinal member 38L. The first cage member 62 can be connected to a side of the left longitudinal member 38L that can be opposite to the side to which the first cross member 40 is connected. The one end of the first cage member 62 can be aligned in the transverse direction T with the end of the first cross member 40 that is connected to the left longitudinal member 38L.

The fourth-ninth cross members 50, 52, 54, 56, 58, 59 can extend in the transverse direction T of the vehicle 10 from the left side assembly 48L to the right side assembly 48R. The fourth-ninth cross members 50, 52, 54, 56, 58, 59 can extend from the left side assembly 48L to the right side assembly 48R. The fourth-ninth cross members 50, 52, 54, 56, 58, 59 can be connected to each of the side assemblies 48L, 48R at respective locations spaced apart along the longitudinal direction L of the vehicle 10. The fourth-ninth cross members 50, 52, 54, 56, 58, 59 can be configured to maintain a predetermined spacing between the left side assembly 48L and the right side assembly 48R in the transverse direction T. The fourth-ninth cross members 50, 52, 54, 56, 58, 59 can define the limits of the passenger area in the longitudinal direction L of the vehicle 10 and the vertical direction V of the vehicle 10. As will be discussed in detail below, the fourth-ninth cross members 50, 52, 54, 56, 58, 59 can be configured to manage the energy of an impact event so that deflection of the frame assembly 18 in the vicinity of the passenger area can be controlled in an advantageous predetermined manner. In the exemplary embodiments of FIGS. 1-16, the fifth-ninth cross members 50, 52, 54, 56, 58, 59 can be connected to the side assemblies 48L, 48R by welding.

Referring to FIGS. 2, 4 and 5, the fourth cross member 50 can include a pair of substantially straight outer portions joined to a substantially straight central portion by two bend portions such that the pair of outer portions can extend at an obtuse angle relative to the central portion. As a result, the fourth cross member 50 can extend in a generally arcuate shape from the left side assembly 48L to the right side assembly 48R, with the convex portion facing toward the front of the vehicle 10 and the concave portion facing toward the passenger area. The fourth cross member 50 can be configured as a hollow tube having a substantially circular cross-sectional shape. As will be discussed in detail below, the generally arcuate configuration of the fourth cross member 50 can be effective in managing the energy of an impact event, so that deflection of the frame assembly 18 in the vicinity of the passenger area can be controlled in an advantageous predetermined manner. The fourth cross member 50 can be connected to each of the side assemblies 48L, 48R adjacent a respective front end of the side assemblies 48L, 48R, and spaced above the first cross member 40 in the vertical direction V of the vehicle 10.

The fifth cross member 52 can be spaced to extend in a generally straight direction from the left side assembly 48L to the right side assembly 48R. The fifth cross member 52 can be configured as a hollow tube having a substantially circular cross-sectional shape. As will be discussed in detail below, the generally straight configuration of the fifth cross member 52 can be effective in managing the energy of an impact event so that deflection of the frame assembly 18 in the vicinity of the passenger area can be controlled in an advantageous predetermined manner. The fifth cross member 52 can be connected to the side assemblies 48L, 48R adjacent a respective front end of the side assemblies 48L, 48R, and spaced above the fourth cross member 50 in the vertical direction V of the vehicle 10, such that the fourth cross member 50 can be positioned between the first cross member 40 and the fifth cross member 52.

The sixth cross member 54 can be shaped to extend in a generally straight direction from the left side assembly 48L to the right side assembly 48R. The sixth cross member 54 can be configured as a hollow tube having a substantially circular cross-sectional shape. The sixth cross member 54 can be connected to the side assemblies 48L, 48R adjacent a respective front end of the side assemblies 48L, 48R, and spaced above the fifth cross member 52 in the vertical direction V of the vehicle 10, such that the fifth cross member 52 can be positioned between the fourth cross member 50 and the sixth cross member 54. The sixth cross member 54 can cooperate with the fifth cross member 52 and a portion of the front ends of the side assemblies 48L, 48R to support a windshield (flexible or rigid) of the vehicle 10.

The seventh cross member 56 can be shaped to extend in a generally straight direction from the left side assembly 48L to the right side assembly 48R. The seventh cross member 56 can be configured as a hollow tube having a substantially circular cross-sectional shape. The seventh cross member 56 can be connected to the side assemblies 48L, 48R at the rear ends of the side assemblies 48L, 48R.

The eighth and ninth cross members 58, 59 can be shaped to extend in a generally arcuate direction from the left side assembly 48L to the right side assembly 48R and above the passenger area. The eighth an ninth cross members 58, 59 can be connected to the side assemblies 48L, 48R, with the concave portion facing toward the passenger compartment (for example, downwardly in the vertical direction V of the vehicle 10), and the convex portion facing away from the passenger area (for example, upwardly in the vertical direction of the vehicle 10). As will be discussed in detail below, this orientation of the generally arcuate eighth and ninth cross members 58, 59 can be effective in managing the energy of an impact event so that deflection of the frame assembly 18 in the vicinity of the passenger area can be controlled in an advantageous predetermined manner. The generally arcuate eighth and ninth cross members 58, 59 can be formed with a constant radius of curvature, a variable radius of curvature, or in any manner described herein with respect to the first, fourth and fifth cross members 40, 50, 52.

The eighth and ninth cross members 58, 59 can be configured as a hollow tube having a substantially circular cross-sectional shape. The eighth and ninth cross members 58, 59 can be connected to the side assemblies 48L, 48R intermediate the front end and the rear end of the side assemblies 48L, 48R, such that the eighth and ninth cross members 58, 59 can be positioned between the sixth cross member 54 and the seventh cross member 56. The eighth cross member 58 can be closer to the sixth cross member 54 and the ninth cross member 59 can be closer to the seventh cross member 56. The eighth and ninth cross members 58, 59 can cooperate with a portion of each of the side assemblies 48L, 48R intermediate the front end and rear end thereof to support a roof panel (flexible or rigid) of the vehicle 10.

The support members 60L, 60R can extend from the fourth cross member 50 to the fifth cross member 52. The support members 60L, 60R can be connected the central portions of the fourth and fifth cross members 50, 52. The support members 60L, 60R can each be configured as a hollow tube having a substantially circular cross-sectional shape. In the exemplary embodiments of FIGS. 1-16, the support members 60L, 60R can be connected to the fourth and fifth cross members 50, 52 by welding.

B. Front Sub-Frame Assembly

Referring to FIGS. 2-5, the front sub-frame assembly 32 can be connected to the central portions of the first and fourth cross members 40, 50 of the main frame assembly 30. The front sub-frame assembly 32 can include a pair of lower bent members 76L, 76R, a pair of upper bent members 78L, 78R, a pair of second support members 80L, 80R, a pair of intermediate members 82L, 82R, a lower cross member 84 and an upper cross member 86.

Each of the lower bent members 76L, 76R can include a first end, second end and bend portion 88L, 88R between or intermediate the first and second end. The first ends of the lower bent members 76L, 76R can be connected to the central portion of the first cross member 40. The lower bent members 76L, 76R can extend from the first cross member 40 toward the front of the vehicle 10 substantially in the longitudinal direction L of the vehicle 10. The lower bent members 76L, 76R can be spaced apart from each other in the transverse direction T of the vehicle 10 by a predetermined distance sufficient to accommodate any component(s) and/or system(s) to be supported by the front sub-frame assembly 32. The lower cross member 84 can be connected to the second ends of the lower bent members 76L, 76R.

The bend portions 88L, 88R can be located and shaped to provide an advantageous predetermined and controlled deformation of the lower bent members 76L, 76R if the front sub-frame assembly 32 is subjected to an impact event. For example, the bend portions 88L, 88R can be formed such that the first ends of the lower bent members 76L, 76R are outwardly spaced from the center of the vehicle 10 in the transverse direction T of the vehicle 10 relative to the second ends of the lower bent members 76L, 76R. The bend portions 88L, 88R can be formed such that a portion of each lower bent member 76L, 76R that includes the first end extends at an obtuse angle with respect to a portion of each lower member 76L, 76R that includes the second end. In other words, the lower bent members 76L, 76R can have a generally arcuate portion that has a concave side facing outwardly of the vehicle 10 generally in the transverse direction T, and a convex side facing inwardly of the vehicle 10 generally in the transverse direction T of the vehicle 10. The bend portions 88L, 88R can be formed in any appropriate manner, such as but not limited to a smooth curved portion formed by a bending process, a junction of two or more linear portions connected at an obtuse angle, etc., to achieve the desired energy management through deformation. Further details of the deformation of the lower bent members 76L, 76R will be discussed below.

Each of the upper bent members 78L, 78R can include a first end, second end, a first portion 79aL, 79aR, a second portion 79bL, 79bR and an upper bend portion 89L, 89R formed on the first portion 79aL, 79aR. The first ends of the upper bent members 78L, 78R can be connected to the central portion of the fourth cross member 50. The first portions 79aL, 79aR of the upper bent members 78L, 78R can extend from the fourth cross member 50 toward the front of the vehicle 10 substantially in the longitudinal direction L of the vehicle 10. The second portion 79bL, 79bR of each of the upper bent members 78L, 78R can extend at an angle from the respective first portion 79aL, 79aR to the second end such that the second portion 79bL, 79bR extends generally in the vertical direction of the vehicle 10. The second end of each of the upper bent members 78L, 78R can be connected to at least one of the lower cross member 84 and a respective one of the lower bent members 76L, 76R adjacent the second end of the respective one of the lower bent members 76L, 76R. The upper bent members 78L, 78R can be spaced apart from each other in the transverse direction T of the vehicle 10 by a predetermined distance sufficient to accommodate any component(s) and/or system(s) to be supported by the front sub-frame assembly 32. The upper cross member 86 can be connected to the upper bent members 78L, 78R at a location adjacent the junctions of the first portions 79aL, 79aR and second portions 79bL, 79bR of the upper bent members 78L, 78R.

The upper bend portions 89L, 89R can be located and shaped to provide an advantageous predetermined and controlled deformation of the upper bent members 78L, 78R if the front sub-frame assembly 32 is subjected to an impact event. For example, the upper bend portions 89L, 89R can be formed such that the first ends of the upper bent members 78L, 78R are outwardly spaced from the center of the vehicle 10 in the transverse direction T of the vehicle 10 relative to the second ends of the upper bent members 78L, 78R. The upper bend portions 89L, 89R can be formed such that a portion of the first portion 79aL, 79aR that includes the junction with the respective second portion 79bL, 79bR extends at an obtuse angle with respect to a portion of the first portion 79aL, 79aR that includes the first end. In other words, the first portion 79aL, 79aR of each of the upper bent members 78L, 78R can be generally arcuate, and can have a concave side facing outwardly of the vehicle 10 generally in the transverse direction T, and a convex side facing inwardly of the vehicle 10 generally in the transverse direction T of the vehicle 10. The bend portions 89L, 89R can be formed in any appropriate manner, such as but not limited to a smooth curved portion formed by a bending process, a junction of two or more linear portions connected at an obtuse angle, etc., to achieve the desired energy management through deformation. Further details of the deformation of the upper bent members 78L, 78R will be discussed below.

The second support members 80L, 80R can be configured with any appropriate shape that can achieve the performance of the front sub-frame assembly 32 under normal operation or during an impact event that is desired for the vehicle 10. For example, the second support members 80L, 8R can be slightly bent, substantially straight, etc. The second support members 80L, 80R can extend from a respective one of the upper bent members 78L, 78R to a respective one of the lower bent members 76L, 76R. The second support members 80L, 80R can extend generally in the vertical direction V of the vehicle 10. The second support members 80L, 80R can be connected to the respective one of the upper bent members 78L, 78R and the lower bent members 76L, 76R adjacent the respective bend portions 88L, 88R, 89L, 89R, such that the second support members 80L, 80R contact regions disposed between the bend portions 88L, 88R, 89L, 89R and the second ends of the upper bent members 78L, 78R and the lower bent members 76L, 76R.

The front suspension components associated with the front wheels 14L, 14R can be connected to the front sub-frame assembly 32 by mounting points located on or adjacent to the upper bent members 78L, 78R and the lower bent members 76L, 76R. In exemplary embodiments, one or more of the front suspension components can be connected to the respective one of the lower bent members 76L, 76R between the respective one of the hinges 96 and the respective one of the bend portions 88L, 88R. In other words, the bend portions 88L, 88R can be positioned between the first cross member 40 and the respective suspension components. In other exemplary embodiments, one or more of the front suspension components can be connected to the respective one of the upper bent members 78L, 78R at any appropriate location that is spaced forward of the bend portions 89L, 89R in the longitudinal direction of the vehicle 10. In other words, the bend portions 89L, 89R can be positioned between the fifth cross member 52 and the respective suspension components.

C. Front Bumper Assembly

Referring to FIGS. 2-5, the front bumper assembly 34 can be connected to the front end of the front sub-frame assembly 32, such that the front sub-frame assembly 32 is between or intermediate the front bumper assembly 34 and the main frame assembly 30. The front bumper assembly 34 can include a pair of lateral members 90L, 90R, a bumper member 92 and a pair of crumple members 94L, 94R.

A first end of each of the lateral members 90L, 90R can be connected to at least one of the lower cross member 84 and a respective one of the lower bent members 76L, 76R by a pair of hinges 96. However, exemplary embodiments are intended to include any appropriate connection that can achieve the desired performance of the bumper assembly 34 during an impact event. The lateral members 90L, 90R can extend from the front sub-frame assembly 32 generally in the longitudinal direction L of the vehicle 10 and the vertical direction of the vehicle 10, such that the second ends of the lateral members 90L, 90R are spaced forward of and above the respective one of the first ends. The lateral members 90L, 90R can be spaced apart in the transverse direction T of the vehicle 10 by any appropriate distance that can achieve the desired performance of the front bumper assembly 34 during an impact event.

The bumper member 92 can be connected to the second ends of the lateral members 90L, 90R. The bumper member 92 can be configured with any appropriate shape and dimensions that can achieve the desired performance of the front bumper assembly 34 during an impact event.

The crumple members 94L, 94R can be configured to collapse through deformation in a predetermined and controlled manner during an impact event. For example, the crumple members 94L, 94R can be formed from any material and/or with any structure that can promote the desired deformation. By way of example only, FIGS. 2-11, show the crumple members 94L, 94 as elongate members having a rectangular cross-sectional shape. Further, by way of example only, the crumple members 94L, 94R can include one or more holes, cutouts, corrugated regions, bends, any combination thereof, etc., that can permit the crumple members 94L, 94R to deform in a predetermined and controlled manner during an impact event.

The crumple members 94L, 94R can extend from the front sub-frame assembly 32 to the lateral members 90L, 90R. A first end of each of the crumple members 94L, 94R can be connected to a respective one of the second portions 79bL, 79bR of the upper bent members 78L, 78R in longitudinal alignment with the respective one of the intermediate members 82L, 82R. A second end of each of the crumple members 94L, 94R can be connected to a respective one of the lateral members 90L, 90R between or intermediate the bumper member 92 and the hinges 96. However, exemplary embodiments are intended to include any appropriate location of the connections for the crumple members 94L, 94R that can achieve the desired performance for the bumper assembly 34 and/or the front sub-frame assembly 32 and/or the main frame assembly 30.

III. Impact Energy Management

Energy management during an impact event that can be provided by the frame assembly 18 is described with reference to FIGS. 6-14. FIGS. 6, 8, 10 and 12 depict portions of the frame assembly 18 prior to an impact event, FIG. 13 depicts portions of the frame assembly 18 during an initial stage of the impact event, and FIGS. 7, 9, 11 and 14 depict portions of the frame assembly 18 subsequent to the impact event.

During a first stage of the impact event, the front bumper assembly 34 can come into engagement with or by an impact object. The bumper member 92 can transmit the impact load to the crumple members 94L, 94R via the lateral members 90L, 90R. The lateral members 90L, 90 can transmit a portion of the impact load to each of the crumple members 94L, 94R.

During a second stage of the impact event, the impact load can cause the crumple members 94L, 94R to collapse through deformation toward the front sub-frame assembly 32, and the lateral members 90L, 90R can pivot about the hinge 96.

If the impact event includes sufficient energy, the impact load can completely collapse the front bumper assembly 34, such that the bumper member 92 contacts or becomes slightly spaced from the second portions 79bL, 79bR of the upper bent members 78L, 78R. Thus, the front bumper assembly 34 can dissipate at least a portion of the impact energy into the movement of the lateral members 90L, 90R and the bumper member 92, and into deformation for the crumple members 94L, 94R.

If the complete collapse of the bumper assembly 34 does not completely dissipate the impact energy, then during a third stage of the impact event, the collapsed bumper assembly 34 can transmit the remaining impact load to the front sub-frame assembly 32. In response, the lower bent members 76L, 76R can deform at the bend portions 88L, 88R, and the upper bent members 78L, 78R can deform at the upper bend portions 89L, 89R. The bend portions 88L, 88R and the upper bend portions 89L, 89R can be tuned or configured to permit the front sub-frame assembly to collapse toward the main frame assembly 30, such that the second support members 80L, 80R can contact or become slightly spaced from the fourth cross beam 50, and can become slightly spaced from and above the first cross beam 40.

If the complete collapse of the front sub-frame assembly 32 does not completely dissipate the impact energy, then during a fourth stage of the impact event, the collapsed front sub-frame assembly 32 can transmit the remaining impact load to the main frame assembly 30. In response, the main frame assembly 30 can dissipate at least a portion of the remaining impact energy through controlled and predetermined deformation.

Figure 12:
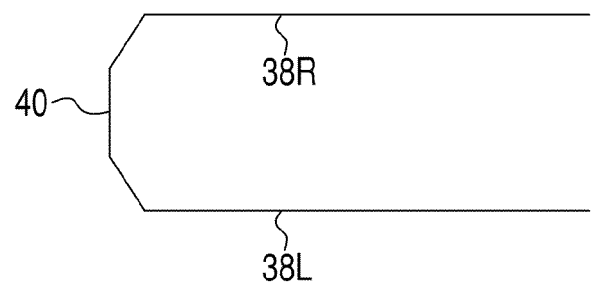
FIG. 12 is a schematic diagram of a portion of the vehicle crash management apparatus of FIG. 2 in the vicinity of the passenger area prior to an impact event.
Figure 13:
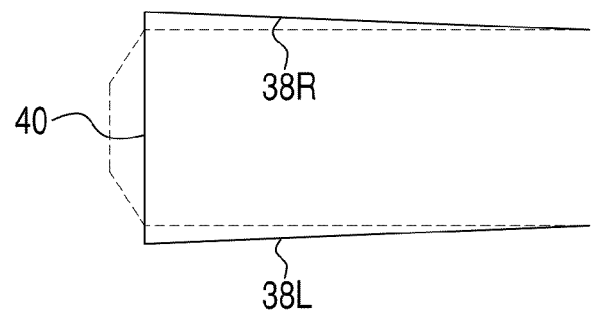
FIG. 13 is a schematic diagram of a portion of the vehicle crash management apparatus of FIG. 2 in the vicinity of the passenger area during an impact event.
Figure 14:
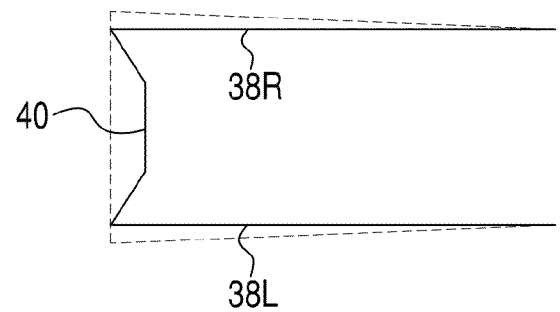
FIG. 14 is a schematic diagram of a portion of the vehicle crash management apparatus of FIG. 2 in the vicinity of the passenger area subsequent to the impact event.

FIGS. 12-14 schematically illustrate this deformation of the main frame assembly 30. The front bumper assembly 34, the front sub-frame assembly 32 and the roll cage 28 are omitted from FIGS. 12-14 for simplicity and clarity of the drawings.

FIG. 12 schematically depicts the first cross member 40 and the longitudinal members 38L, 38R prior to complete collapse of the front bumper assembly 34 and the front sub-frame assembly 32.

FIG. 13 schematically depicts deformation of the front cross member 40 and the longitudinal members 38L, 38R during an initial portion of the fourth stage of the impact event. Here, the first cross member 40 and the longitudinal members 38L, 38R can be deformed from their original positions and shapes (as shown by the dotted lines) to an intermediate position and shape (as shown by the solid lines). For example, the impact load transmitted to the first cross member 40 by the collapsed front sub-frame assembly 32 can deform the first cross member 40 from its original generally arcuate shape to a substantially straight shape. This deformation can cause an increase in the span of the first cross member 40 as measured in the transverse direction T of the vehicle 10. This increased span can push the front ends of the longitudinal members 38L, 38R outwardly generally in the transverse direction T of the vehicle 10, thereby deforming the longitudinal members 38L, 38R through bending. Thus, the first cross member 40 can dissipate at least some of the impact load by deforming from a generally arcuate shape to a substantially straight shape, and the longitudinal members 38L, 38R can dissipate at least some of the impact energy by bending outwardly as the first cross member 40 straightens.

If a portion of the impact energy remains after the deformation of the first cross member 40 and the longitudinal members 38L, 38R depicted in FIG. 13, then the first cross member 40 and the longitudinal members 38L, 38R can be further deformed during the fourth stage of the impact event, as shown in FIG. 14. Here, the first cross member 40 and the longitudinal members 38L, 38R can be further deformed from their intermediate positions and shapes (as shown by the dotted lines) to final positions and shapes (as shown by the solid lines). For example, the first cross member 40 can be further deformed into a generally arcuate shape that is inverted as compared to its original generally arcuate shape. This further deformation can reduce the span of the first cross member 40 as measured in the transverse direction of the vehicle 10. As a result of this decreased transverse span, the first cross member 40 can pull the front ends of the longitudinal members 38L, 38R inwardly generally in the transverse direction T of the vehicle 10, thereby further deforming the longitudinal members 38L, 38R through bending. Thus, the first cross member 40 can dissipate a further amount of the impact load by deforming from a generally straight shape to a substantially arcuate shape, and the longitudinal members 38L, 38R can dissipate a further amount of the impact energy by bending inwardly as the first cross member 40 bends to become arcuate.

The first cross member 40 can be tuned or configured such the front ends of the longitudinal members 38L, 38R can return substantially to their original positions prior to the impact event. As such, intrusion of the frame assembly 18 into the passenger area can be impeded, reduced or minimized, while enhancing, increasing or maximizing the impact energy dissipation capacity of the frame assembly 18 during an impact event at the front of the vehicle 10.

The fourth cross member 50 can be configured and disposed so as to be deformed in a manner similar to the first cross member 40, as described above. Here, the fourth cross member 50 can also cause first cage members 62 to bend first outwardly, and then inwardly, in the transverse direction T of the vehicle 10. In other words, the fourth cross member 50 can be configured and disposed so as to perform similarly to the first cross member 40 as explained above with regard to FIGS. 12-14. In fact, embodiments are intended to include or otherwise cover the addition of any number of members to perform similarly to the first and fourth cross members 40 and 50.

Although not depicted in the schematic representations of FIGS. 12-14, it is to be understood that the first cage member 62 and the sixth cage member 72 can be bent outwardly and then possibly inwardly in the transverse direction T of the vehicle 10, as the first and fourth cross members 40, 50 are straightened and possibly inverted by the impact load.

Thus, the front bumper assembly 34, the front sub-frame assembly 32 and the main frame assembly 30 can manage the impact energy from an impact event by dissipating respective portions of the impact energy. Further, intrusion of the frame assembly 18 into the passenger area can be reduced, impeded, or minimized while enhancing, increasing or maximizing the impact energy dissipation capacity of the frame assembly 18 during a frontal impact event.

IV. Alternative Front Bumper Assembly

Figure 15:
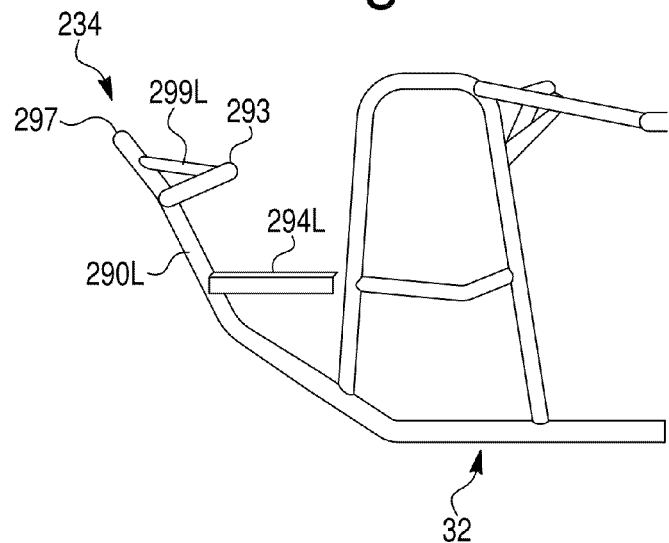
FIG. 15 is a side view of an alternate embodiment of a front portion of the vehicle crash management apparatus of FIG. 2.
Figure 16:
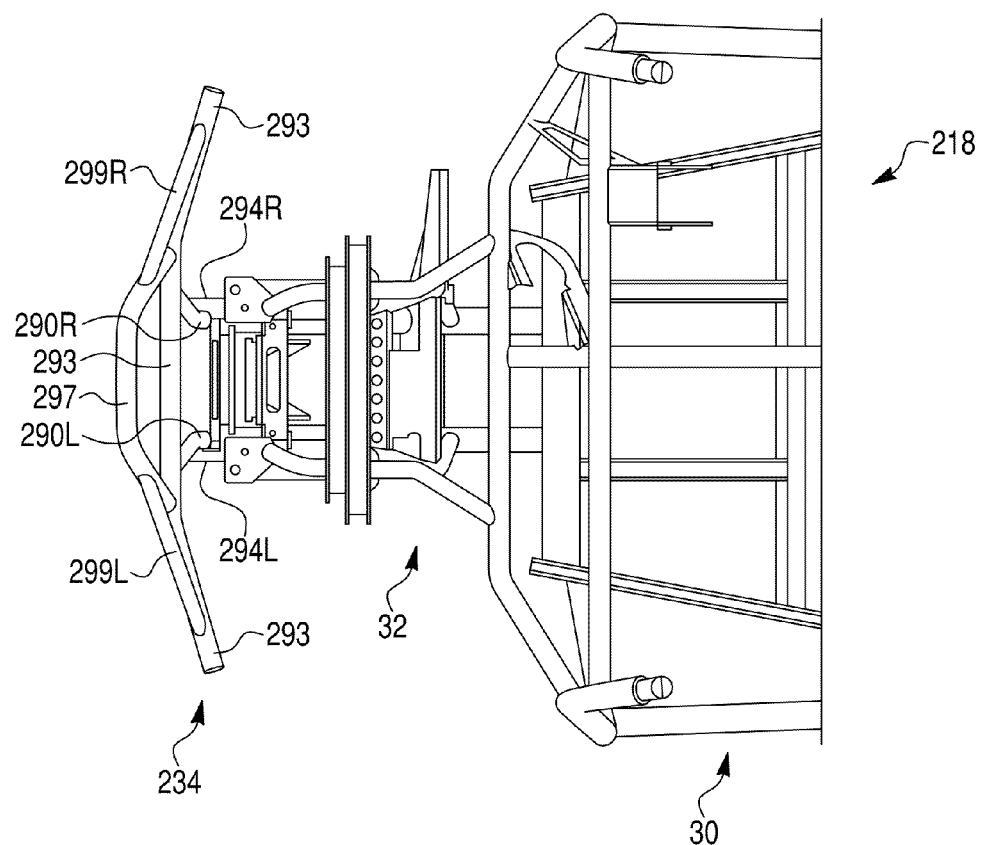
FIG. 16 is a top view of front portion of the vehicle crash management apparatus of FIG. 15.

FIGS. 15-16 illustrate a front bumper assembly 234 of an alternate embodiment in accordance with the disclosed subject matter. It is to be understood that the front sub-frame assembly 32 and the main frame assembly 30 can be configured as described above with respect to FIGS. 1-14.

The front bumper assembly 234 can include a pair of lateral members 290L, 290R, a base member 293, a pair of crumple members 294L, 294R, a central member 297, and a pair of brace members 299L, 299R.

The lateral members 290L, 290R can be connected to the front sub-frame assembly 32 as described above with respect to FIGS. 1-14. The crumple members 294L, 294R can extend from the front sub-frame assembly 32 to a respective one of the lateral members 290L, 290R. The crumple members 294L, 294R can be connected to the front sub-frame assembly 32 and a respective one of the lateral members 290L, 290R as described above with respect to FIGS. 1-14. The lateral members 290L, 290R and the crumple members 294L, 294R can be configured and can move/deform in response to an impact event as described above with respect to FIGS. 1-14.

The base member 293 can be connected to the second ends of the lateral members 290L, 290R. The base member 293 can extend in the transverse direction T of the vehicle 10 beyond the lateral members 290L, 290R. The base member 293 can have a generally arcuate shape, such that a concave side faces toward the passenger area of the vehicle 10 and a convex side faces towards the front of the vehicle 10.

The central member 297 can be configured with a generally inverted U-shape. The two ends of the central member 297 can be connected to the base member 293 at a central portion thereof.

The brace members 299L, 299R can be connected to the base member 293 and the central member 297 on either side of the central member 297. The brace members 299L, 299R can extend at an acute angle from the base member 293.

The base member 293, the central member 297 and the brace members 299L, 29R can operate substantially as described above with respect to the bumper member 92 of FIGS. 1-14.

V. Alternative Embodiments

While certain embodiments of the invention are described above, and FIGS. 1-16 disclose the best mode for practicing the various inventive aspects, it should be understood that the invention can be embodied and configured in many different ways without departing from the spirit and scope of the invention.

For example, embodiments are disclosed above in the context of the first and fourth cross members 40 and 50 shown in FIGS. 2-14. However, embodiments are intended to include or otherwise cover any type of cross member having a generally arcuate shape disclosed above.

For example, exemplary embodiments are intended to include a first cross member 40 that extends in an arc from the left longitudinal member 38L to the right longitudinal member 38R. This arc can have a constant radius of curvature or a variable radius of curvature. In other words, the entire front cross member 40 can be arcuate. In another alternate embodiment, the central section of the first cross member 40 can be substantially straight, and the outer sections can be arcuate, with a constant radius of curvature or a variable radius of curvature through the arcuate portions.

In fact, in some embodiments, the first cross member 40 does not include any arcuate portions. Instead, the outer ends of the first cross member 40 can extend linearly at an angle relative to the central portion.

All or some of the alternative structures disclosed above with regard to the first cross member 40 also apply to the fourth cross member 50. The above alternative structures of the first and fourth cross members 40 and 50 are merely provided for exemplary purposes, and as indicated above, embodiments are intended to cover any type of generally arcuate or angled first and fourth cross members 40 and 50 that operate or otherwise perform as disclosed above. Embodiments are also intended to include or otherwise cover any alternative or additional cross members that are structured and disposed to perform as disclosed above with regard to the first and fourth cross members 40 and 50.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A crash management system for dissipating at least a part of impact energy applied to a vehicle that includes suspension components and a passenger compartment, the crash management system comprising:
    a main frame that is configured to define the passenger compartment of the vehicle, the main frame including a lower cross member that generally extends along a transverse direction of the vehicle; and
    a front sub-frame that includes a pair of bent members, each of the bent members including a longitudinal portion that extends along a longitudinal direction of the vehicle and that is configured to support the suspension components, each of the bent members also including a bend portion that extends from the respective longitudinal portion at an angle and that is disposed between the respective longitudinal portion and the lower cross member of the main frame, the bend portions extending across a transverse plane to the vehicle and being directly connected to the lower cross member, the longitudinal and bend portions being configured such that each of the bend portions deform, and each of the longitudinal portions continue to extend substantially longitudinally, if the impact energy applied to the vehicle exceeds a first threshold.

2. The crash management system of claim 1, wherein the lower cross member includes a central transverse portion that extends along a transverse direction of the vehicle and a pair of end portions that each extend at an angle relative to the central transverse portion away from the front sub-frame, the bent members of the front sub-frame being connected to the central transverse portion such that the bent members communicate the force to the central transverse portion to cause the central transverse portion to deform away from the front sub-frame if the impact energy applied to the vehicle exceeds a second threshold that is greater than the first threshold.

3. The crash management system of claim 2, wherein the bend portions of the bent members are connected to the central transverse portion at locations on opposite sides of, and equidistant from, a transverse center-point of the lower cross member.

4. The crash management system of claim 1, wherein the main frame includes an upper cross member having opposite ends that are connected to opposing vertically extending cage members, the upper cross member generally extending along a transverse direction of the vehicle above the lower cross member.

5. The crash management system of claim 4, wherein the front sub-frame includes a pair of upper bent members that each include a vertically extending linear member and an upper bent member that is connected to the upper cross member.

6. The crash management system of claim 5, wherein the front sub-frame includes a pair of vertically extending support members, one end of each of the support members being connected to one of the bent members and the other end being connected to one of the upper bent members.

7. The crash management system of claim 5, further comprising a front bumper assembly that includes a pair of vertically extending lateral members, a bumper member connected to an upper end of each of the vertically extending lateral members, and a pair of crumple members that are each connected to one of the vertically extending linear members of the upper bent members of the front sub-frame and one of the lateral members.

8. The crash management system of claim 7, wherein the crumple members are configured to collapse toward the front sub-frame upon application of a sufficient amount of the impact energy to enable the bumper member to contact the vertically extending linear members of the upper bent members of the front sub-frame.

9. The crash management system of claim 6, wherein the front sub-frame includes a pair of longitudinally extending intermediate members, one end of each of the intermediate members being connected to one of the support members and the other end being connected to one of the vertically extending linear members of the upper bent members.

10. The crash management system of claim 4, wherein the main frame includes a supplemental cross member having opposite ends that are connected to the opposing vertically extending cage members above the upper cross member, and a pair of supports, one end of each support being connected to the upper cross member and the opposite end being connected to the supplemental cross member.

11. A front sub-frame for dissipating at least a part of impact energy applied to a vehicle that includes suspension components, a passenger compartment, and a main frame that is configured to define the passenger compartment, the main frame including a lower cross member that generally extends along a transverse direction of the vehicle, front sub-frame comprising:
  a pair of bent members, each of the bent members including a longitudinal portion that extends along a longitudinal direction of the vehicle and that is configured to support the suspension components, each of the bent members also including a bend portion that extends from the respective longitudinal portion at an angle and that is disposed between the respective longitudinal portion and the lower cross member of the main frame, the bend portions extending across a transverse plane of the vehicle and being directly connected to the lower cross member, the longitudinal and bend portions being configured such that each of the bend portions deform, and each of the longitudinal portions continue to extend substantially longitudinally, if the impact energy applied to the vehicle exceeds a first threshold.

12. The front sub-frame of claim 11, wherein the lower cross member includes a central transverse portion that extends along a transverse direction of the vehicle and a pair of end portions that each extend at an angle relative to the central transverse portion away from the front sub-frame, the bent members of the front sub-frame being connected to the central transverse portion such that the bent members communicate the force to the central transverse portion to cause the central transverse portion to deform away from the front sub-frame if the impact energy applied to the vehicle exceeds a second threshold that is greater than the first threshold.

13. The front sub-frame of claim 12, wherein the bend portions of the bent members are connected to the central transverse portion at locations on opposite sides of, and equidistant from, a transverse center-point of the lower cross member.

14. The front sub-frame of claim 11, wherein the main frame includes an upper cross member having opposite ends that are connected to opposing vertically extending cage members, the upper cross member generally extending along a transverse direction of the vehicle above the lower cross member.

15. The front sub-frame of claim 14, wherein the front sub-frame includes a pair of upper bent members that each include a vertically extending linear member and an upper bent member that is connected to the upper cross member.

16. The front sub-frame of claim 15, wherein the front sub-frame includes a pair of vertically extending support members, one end of each of the support members being connected to one of the bent members and the other end being connected to one of the upper bent members.

17. The front sub-frame of claim 15, further comprising a front bumper assembly that includes a pair of vertically extending lateral members, a bumper member connected to an upper end of each of the vertically extending lateral members, and a pair of crumple members that are each connected to one of the vertically extending linear members of the upper bent members of the front sub-frame and one of the lateral members, the crumple members being configured to collapse toward the front sub-frame upon application of a sufficient amount of the impact energy to enable the bumper member to contact the vertically extending linear members of the upper bent members of the front sub-frame.

18. The front sub-frame of claim 16, wherein the front sub-frame includes a pair of longitudinally extending intermediate members, one end of each of the intermediate members being connected to one of the support members and the other end being connected to one of the vertically extending linear members of the upper bent members.

19. The front sub-frame of claim 14, wherein the main frame includes a supplemental cross member having opposite ends that are connected to the opposing vertically extending cage members above the upper cross member, and a pair of supports, one end of each support being connected to the upper cross member and the opposite end being connected to the supplemental cross member.

20. A method of manufacturing a crash management system for dissipating at least a part of impact energy applied to a vehicle, the method comprising:
  configuring a main frame to define a passenger compartment of the vehicle;
  extending a lower cross member of the main frame generally along a transverse direction of the vehicle;
  configuring a front sub-frame to include a pair of bent members;
  extending a longitudinal portion of each of the bent members along a longitudinal direction of the vehicle;
  supporting suspension components of the vehicle with the longitudinal portion of each of the bent members;
  extending a bend portion of each of the bent members from the respective longitudinal portion at an angle;
  disposing each of the bend portions between the respective longitudinal portion and the lower cross member of the main frame, the bend portions extending across a transverse plane of the vehicle and being directly connected to the lower cross member; and
  configuring the longitudinal and bend portions such that each of the bend portions deform, and each of the longitudinal portions continue to extend substantially longitudinally, if the impact energy applied to the vehicle exceeds a first threshold.

* * * * *